(12) United States Patent
Vogel

(10) Patent No.: US 10,247,249 B2
(45) Date of Patent: Apr. 2, 2019

(54) CLAMPING DEVICE FOR A SHAFT-HUB CONNECTION

(71) Applicant: Florian Vogel, Baden-Baden (DE)

(72) Inventor: Florian Vogel, Baden-Baden (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 604 days.

(21) Appl. No.: 13/845,012

(22) Filed: Mar. 17, 2013

(65) Prior Publication Data
US 2013/0217510 A1 Aug. 22, 2013

Related U.S. Application Data

(63) Continuation of application No. PCT/DE2011/001111, filed on May 20, 2011.

(30) Foreign Application Priority Data

Nov. 24, 2010 (DE) .......................... 10 2010 052 213

(51) Int. Cl.
| | |
|---|---|
| F16D 1/10 | (2006.01) |
| F16D 3/12 | (2006.01) |
| F16D 13/70 | (2006.01) |

(52) U.S. Cl.
CPC ............... *F16D 3/12* (2013.01); *F16D 1/10* (2013.01); *F16D 2001/103* (2013.01); *F16D 2013/703* (2013.01); *F16D 2300/12* (2013.01)

(58) Field of Classification Search
USPC ......... 464/51, 68.1, 68.6, 73, 77, 82, 84, 98; 192/200, 207, 213.12, 213.21, 213.22,
(Continued)

(56) References Cited

U.S. PATENT DOCUMENTS

| 4,588,062 A | * | 5/1986 | Caray et al. | ............... 192/214.1 |
| 5,797,474 A | * | 8/1998 | Nakane | ................. F16D 13/646 |
| | | | | 192/200 |

(Continued)

FOREIGN PATENT DOCUMENTS

| DE | 10 2009 030 976 A1 | 1/2010 |
| DE | 10 2009 033 864 A1 | 2/2010 |

(Continued)

*Primary Examiner* — Matthieu F Setliff
(74) *Attorney, Agent, or Firm* — Kevin L. Parks

(57) ABSTRACT

A clamping device for a shaft-hub connection in a torque-transferring device in a drive train of a vehicle. The connection is an axial spline connection between an externally toothed shaft and an internally toothed hub. An externally toothed ring is provided for clamping the shaft and hub, wherein the externally toothed ring includes an annular body having external teeth. Fastening tongues of leaf-spring-type design are provided on and extend from the radially inner side of the annular body. Outer ends of the leaf-spring-type fastening tongues are attached to the shaft, and the teeth of the toothed ring mesh with teeth of the hub. By rotating the toothed ring against a force provided by the fastening tongues, a clamping force is produced on the shaft-hub connection in the assembled state and is introduced into the shaft-hub connection through the teeth and fastening tongues.

10 Claims, 15 Drawing Sheets

(58) Field of Classification Search
USPC ...... 192/213.31, 214.1, 109 R, 114 R, 114 T
See application file for complete search history.

(56) References Cited

U.S. PATENT DOCUMENTS

| | | | |
|---|---|---|---|
| 5,908,095 A * | 6/1999 | Jackel et al. | 192/207 X |
| 6,525,091 B2 * | 2/2003 | Robinson et al. | |
| 7,311,188 B2 * | 12/2007 | Yoshida | F16D 27/112 192/200 |
| 7,665,590 B2 * | 2/2010 | Kroll et al. | |
| 7,980,369 B2 * | 7/2011 | Kneidel et al. | 192/207 X |
| 2007/0048082 A1 * | 3/2007 | Hoffmann et al. | |
| 2008/0179157 A1 | 7/2008 | Zhou et al. | 192/48.1 |
| 2009/0250301 A1 | 10/2009 | Mih et al. | 192/20 |
| 2011/0132712 A1 | 6/2011 | Noehl et al. | 192/48.601 |
| 2012/0138410 A1 * | 6/2012 | Vogel et al. | |

FOREIGN PATENT DOCUMENTS

| | | |
|---|---|---|
| EP | 0797015 A2 | 9/1997 |
| WO | WO 2007/000140 A2 | 1/2007 |
| WO | WO 2007/000151 A2 | 1/2007 |
| WO | WO 2008/046379 A1 | 4/2008 |

\* cited by examiner

CLAMPING DEVICE FOR A SHAFT-HUB CONNECTION

CROSS-REFERENCE TO RELATED APPLICATION

This application is a continuation of International Application Serial No. PCT/DE2011/001111, having an international filing date of 20 May 2011, and designating the United States, the entire contents of which are hereby incorporated by reference to the same extent as if fully rewritten.

BACKGROUND OF THE INVENTION

Field of the Invention

The present invention relates to a clamping device for a shaft-hub connection in a torque-transferring device in a drivetrain of a vehicle.

Description of the Related Art

A clamping system is known for example from WO 2007/000140 in the form of a clutch system. That clamping system has a shaft element having external teeth, in the form of a ring gear of a clutch, and a hub element having internal teeth, in the form of a flange of a damper. In order to achieve flawless transfer of torque between the shaft element (ring gear) and the hub element (damper flange) with maximally reduced impact or rattling noises due to torsional vibrations, the shaft element has a plurality of cutouts, in each of which is situated a spring element, which has spring arms that engage the internal teeth of the hub element and thereby realize a clamping of the shaft element with the hub element. A disadvantage of this clamping system, however, is the high expense of construction, since cutouts must first be made in the shaft element, which incurs additional costs due to the necessary processing of the shaft element.

An object of the present invention is therefore to provide a clamping device for a shaft-hub connection of the type referred to above, which is distinguished by reduced production costs.

SUMMARY OF THE INVENTION

The present clamping device is usable in particular for torque-transferring devices, consisting of a torsional vibration damper (such as a dual mass flywheel) and a clutch (in particular a dual clutch). An output-side flange of the torsional vibration damper (as an example of a hub element) and a driver ring of the dual clutch (as an example of a shaft element) form an axial spline connection. The present clamping device offers transfer of torque between the dual mass flywheel and the dual clutch with the possibility of axial tolerance compensation.

The invention will be explained in greater detail below, referring to the accompanying drawings, on the basis of preferred exemplary embodiments. They show the following:

DESCRIPTION OF THE PREFERRED EMBODIMENTS

Figure 1:
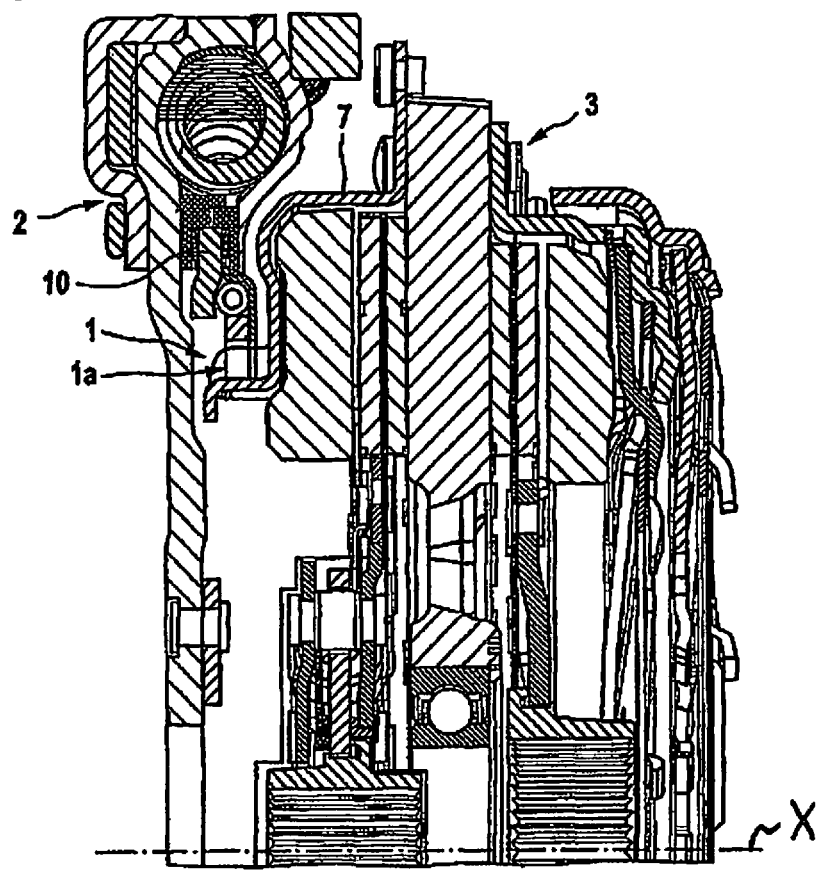
FIG. 1 shows a half-sectional view of a torque-transferring system in a drive train of a motor vehicle, having a first clamping system (=clamping plate) between an output-side flange of a dual mass flywheel (=hub element) and a driver ring (=shaft element) of a (dual) clutch.

FIG. 1 depicts a drive connection 1 which is designed as an axial plug connection 1a. Through that axial plug connection 1a two subunits 2 and 3 are connectable to each other, of which subunit 2 forms a damper that is connectable to the output shaft of an internal combustion engine, and subunit 3 in the depicted exemplary embodiment contains a dual clutch which is pre-installable on the transmission side.

Figure 2:
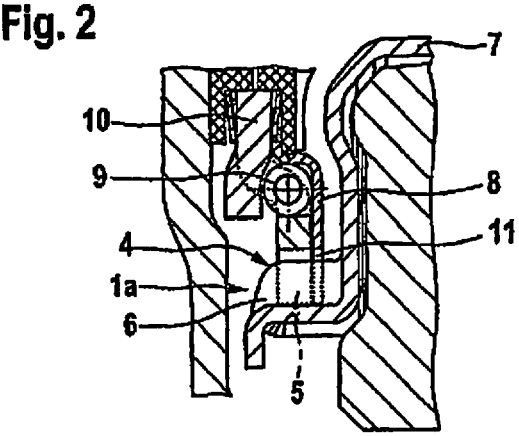
FIG. 2 shows an enlarged view of the plug connection present in FIG. 1.

As can be seen in FIG. 2, axial plug connection 1a is formed by an interlocking connection 4, which has tooth profiles 5 and 6 that engage with each other. In the depicted exemplary embodiment, the tooth profiles 5 are carried by a flange-like output part 10 of damper 2, and the tooth profiles 6 by a driver ring 7, which is a component of the subunit 3 pre-installed on the transmission side. The tooth profiles 5 form internal teeth, whereas the tooth profiles 6 form correspondingly matched external teeth.

In order to ensure circumferential clamping of the tooth profiles 5 and 6, a clamping element 8 is provided, which is acted upon in the circumferential direction by at least one energy storage device 9, which is designed here as a helical compression spring. The energy storage device 9 can also take a different form, however; for example, the clamping element 8, which here is ring-shaped, could have cantilever-beam-like arms that are elastically pre-stressed and produce a circumferential force at least on the clamping element 8. Such arms can be supported on component 10 with appropriate pre-biasing. The energy storage device 9 is installed between the components 10 and 8 with pre-biasing in the circumferential direction.

The clamping element 8 forms or carries at least individual profiles or regions 11 which are suitable for interacting with profiles or teeth of tooth profile 6 of driver ring 7, in that they come to rest with pre-biasing on flanks of such profiles or teeth.

In the depicted exemplary embodiment shown in FIG. 2, the regions 11 of clamping element 8 first include axially extending regions, which extend from the ring-shaped annular body of clamping element 8. On the side of the output part 10 that has the tooth profile 5, which side faces away from the annular body, there are connected regions of clamping element 8 in the form of straps running in the circumferential direction and connected with that side of output part 10. The straps ensure axial connection between the two components 8 and 10.

Before and during the formation of the plug connection 1a shown in FIG. 2, the clamping element 8 (=clamping plate) is secured against the circumferential biasing force produced, for example, by means of energy storage devices 9, in an angularly withdrawn position opposite the tooth profiles 5 of output part 10. That withdrawn position ensures that the tooth profiles 5 and 6, which form the drive connection 1, can be pushed axially freely into engagement with each other.

So FIGS. 1 and 2 show a clamping system having a clamping element 8 that is preloaded in the circumferential direction between an output-side flange 10 of a dual mass flywheel and a driver ring 7 of a (dual) clutch 3. An axial spline connection is provided between the dual mass flywheel output flange 10 and the driver ring 7 in order to transfer torque between the dual mass flywheel and the clutch. To avoid rattling of the axial spline connection due to manufacturing tolerances and fluctuations in torque, a tensioning ring in the form of clamping element 8 is provided that is preloaded in the circumferential direction by means of springs and has internal teeth, wherein the springs are situated between the clamping element 8 and the dual mass flywheel output flange 10, and wherein the teeth of the clamping element 8 furthermore engage the external teeth 6 of the driver ring 7, so that the clamping moment produced by the springs operates between the dual mass flywheel output flange 10 and the driver ring 7. The following description explains an alternative exemplary embodiment of a clamping device, which can be used for clamping the axial spline connection described above, or an axial spline connection at a different location in a drive train of a vehicle.

The toothed ring 110 shown in FIG. 3 (sometimes also referred to below as a "clamping spring"), which is used to clamp the dual mass flywheel output flange 126 and driver ring 7 shown in FIGS. 1 and 2 (or to a comparable input area of the dual clutch), has an essentially rotationally symmetric annular body 113 having internal teeth 112 on its inner circumferential surface with intervening recesses 114, and a plurality of fastening bars 118 in the form of leaf springs (=also referred to below as "fastening tongues") on its outer circumferential surface 116.

Figure 3:
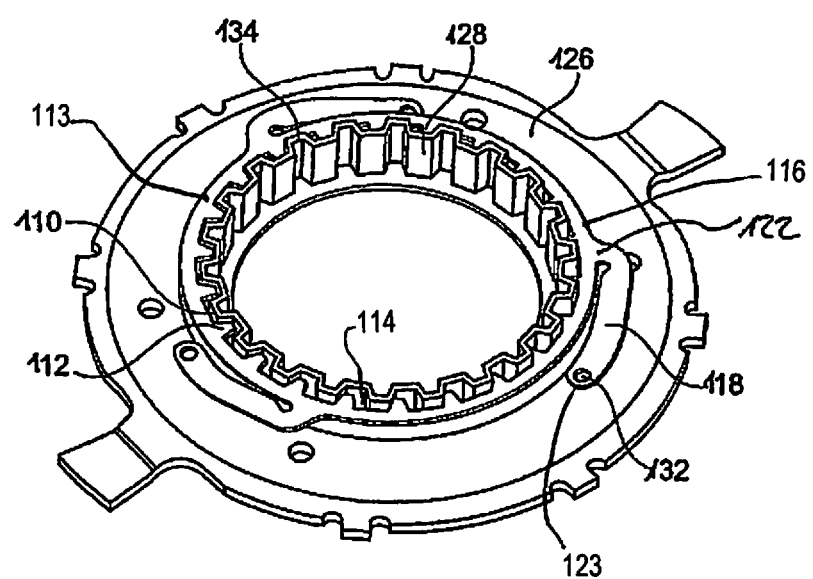
FIG. 3 shows a three-dimensional view of a dual mass flywheel output flange (=hub element) and a driver ring (=shaft element) corresponding to the torque-transferring system according to FIG. 1, wherein a toothed ring 110 is attached by fastening tongues 118 to the dual mass flywheel output flange 126 as an alternative second clamping system, and wherein internal teeth are provided on the toothed ring that engage external teeth of a driver ring.

As shown in FIG. 3, the toothed ring 110 is attached to the dual mass flywheel output flange 126 by means of the fastening tongues 118 and openings 132 for receiving riveted connections.

As also shown in FIG. 3, the internal teeth 112 of toothed ring 110 mesh with external teeth 134 of a toothed ring 128, which is attached to a driver ring 7 of a dual clutch (not shown in FIG. 3). However, the present invention is not limited to use of the toothed ring 128 for clamping a dual mass flywheel and a dual clutch; rather, clamping can be provided here between the dual mass flywheel output flange 126 and a single clutch (not shown). Furthermore, clamping of any other type on an axial spline connection, for example between a clutch plate and the associated transmission input shaft, is also included within the scope of the present invention. To portray the shaft-hub connection more clearly, the driver ring 7 has been omitted from the depiction in FIG. 3.

Dual mass flywheel output flange 126 and toothed ring 128 in combination with the driver ring 7 form a shaft-hub connection within the meaning of the present invention, where circumferential clamping at that connection is effected by the toothed ring 110. In this case, the fastening tongues 118 in the assembled state, i.e., in a state in which the axial spline connection is created between the output flange 126 of the damper unit and the toothed ring 128, produce a force that acts in the circumferential direction (also referred to below as "tangential force"), which produces through the internal teeth of the toothed ring 110 a clamping moment in the circumferential direction between the dual mass flywheel output flange 126 and the driver ring 7, whereby the axial spline connection between output flange 126 and driver ring 7 is biased.

The toothed ring 110 shown here has three leaf-spring-type fastening tongues 118; it can also be provided that two or more of the three leaf-spring-type fastening tongues 118 can be situated on the toothed ring 110. The radial arrangement of fastening tongues 118 and internal teeth 112 can also be interchanged, so that an annular body having external teeth and having fastening tongues provided on the inner circumferential surface would then be provided.

The fastening tongues 118 are fastened at one end 122 (referred to below also as the "second end" of the fastening tongues) directly to the annular body of toothed ring 110; in the present case a one-piece design is provided. Alternatively, the fastening tongues could also be designed as separate components, which are connected to the annular body, for example, by means of riveted connections.

The leaf-spring-type fastening tongues 118 are preferably bowed, or arch-shaped, when viewed in the circumferential direction, so that they run along at least one partial region of the outer circumferential surface 116 of the toothed ring 110.

At another end 123 (referred to below also as the "first end" of the fastening tongues), which is located opposite the second end 122 of the fastening tongues 118, a drilled hole 132 is provided, by means of which the toothed ring 110 can be connected with the dual mass flywheel output flange 126 (=the hub element in the meaning of the present invention) or the ring gear of the toothed driver 128 (=the shaft element in the meaning of the invention), for example by means of a riveted connection.

It is furthermore apparent from FIG. 3 that the fastening tongues 118 also have a curvature in the axial direction of the toothed ring 110. If the toothed ring 110 is connected to the dual mass flywheel output flange 126, this means that the annular body of the toothed ring 110 and the output flange 126 are situated in different axial planes.

Depending on the material and/or because of their curved shape, the fastening tongues 118 of the toothed ring 110 have a certain elasticity, in particular along their longitudinal axis, while the length of the fastening tongues 118 remains essentially constant during the axial movement and the rotation of the toothed ring 110. The toothed ring 110 in this case is preferably made of a thin, flexible sheet metal (spring steel). The fastening tongues can also have waves or other deformations, viewed in the longitudinal direction, or also narrowing, viewed in the lateral direction, to adjust the elasticity of the fastening tongues.

Figure 4:
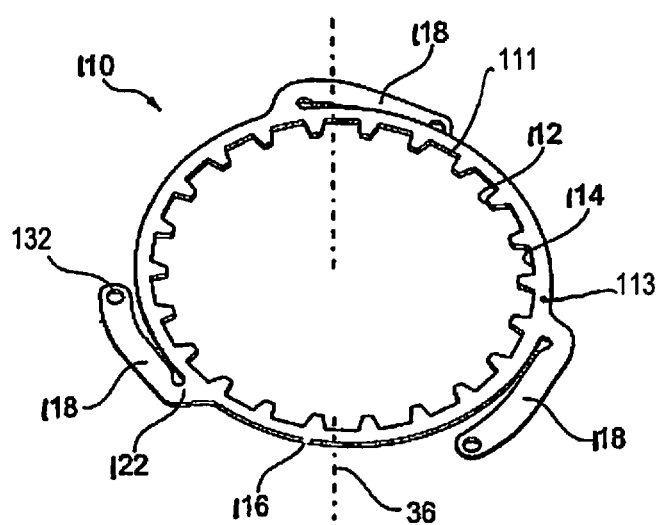
FIG. 4 shows a three-dimensional view of the toothed ring shown in FIG. 2.

FIG. 4 portrays toothed ring 110 in a three-dimensional depiction.

Figure 5:
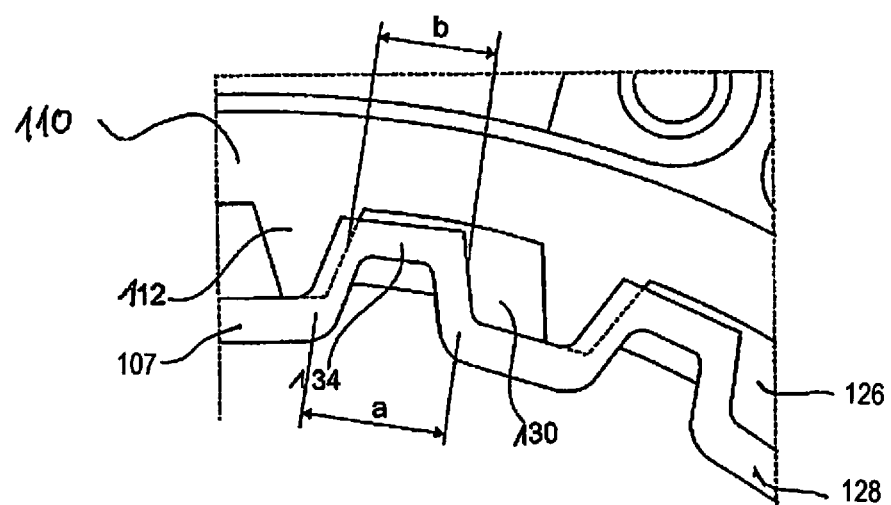
FIG. 5 shows a fragmentary top view of the toothed ring, dual mass flywheel output flange, and driver ring gear in the area of the teeth of the latter.

FIG. 5 shows the shaft-hub connection between the dual mass flywheel output flange 126 and driver ring 107 in a not yet clamped state. The driver ring 107 that has the external teeth 134 is intended to engage between a gap of the internal teeth 112 of the toothed ring 110 and the internal teeth 130 of the dual mass flywheel output flange 126. FIG. 5 shows here an enlarged depiction of the shaft-hub connection of FIG. 3, with the tooth width a of a tooth 134 of the toothed ring 128 of the driver ring of the clutch being shown in relation to the gap b between a tooth of the teeth 112 of the toothed ring 110, and a tooth 130 of the dual mass flywheel output flange 126. To assemble the shaft-hub connection, toothed ring 128 and output flange 126 can be moved axially toward each other. Since the toothed ring 110 is supported on the driver ring through the fastening tongues 118 connected with the output flange 126 and the teeth of the ring gear, a clamping effect occurs, so that a biasing of the shaft-hub connection is realized. Before the clamped state is reached, the gap b has a significantly smaller width than the tooth width a of the toothed ring 128. Only by an axial movement of the toothed ring 110 along its axis of rotation and the resultant rotation of the toothed ring 110 tangentially to its axis of rotation is the gap b between the teeth 112 of the toothed ring 110 and the internal teeth 130 of the output flange 126 enlarged in such a way that the gap b is essentially the same width as the tooth width a of the toothed ring 128. The external teeth 134 of the toothed ring 128 are thus clamped between the teeth 112 of the toothed ring 110 and the internal teeth 130 of the dual mass flywheel output flange 126.

However, with this type of assembly an assembly force must be brought to bear, by which the toothed ring 128 is rotated against the action of the fastening tongues 118. The assembly force is therefore dependent on the clamping force to be generated, and hence on the particular application. If a very high clamping force is needed, then as an alternative to the above exemplary embodiment a forceless assembly can be provided, the details of which will be explained below.

To make assembly easier, the external teeth 134 of the toothed ring 128 can have a chamfered edge on their face. The assembly force for attaching the external teeth 134 of the toothed ring 128 in the gap between the internal teeth 112 of the toothed ring 110 and the internal teeth 130 of the dual mass flywheel output flange 126 thus does not increase until during the assembly itself.

Figure 6:
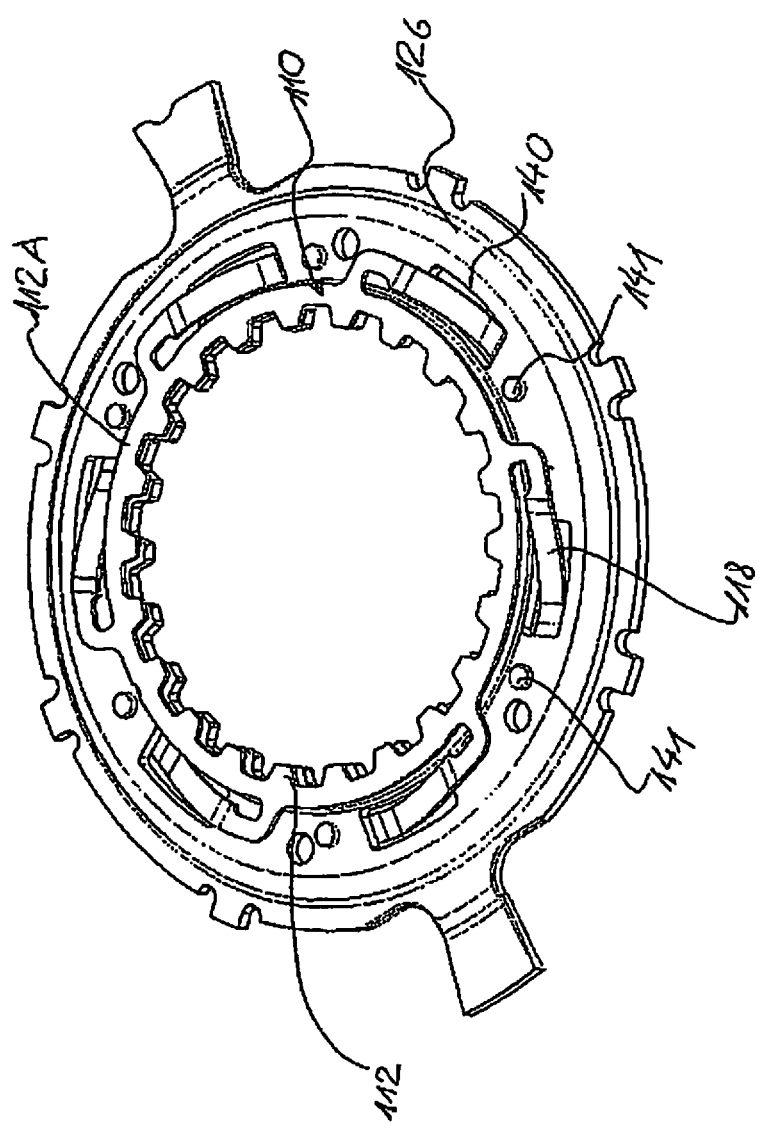
FIG. 6 shows a top perspective view of another exemplary embodiment of the clamping device with penetrations of the fastening tongues through the dual mass flywheel output flange.

As shown in FIG. 6, toothed ring 110 can be attached to the output flange 126 by means of rivets 141, which are situated in bored holes provided in the toothed ring 110 and in the output flange 126.

The driver ring in this case is preferably an input side of a dual clutch. This shaft-hub connection is therefore utilizable as a clamping system in dual clutches (although the present invention is not limited to this, but rather the clamping in general of axial spline connections is affected). With this clamping system, it is possible in particular to eliminate noises in a vehicle that develop due to the play in the shaft-hub connection between dual-clutch damper and dual-clutch transmission, in particular in the form of clattering of teeth.

As can be seen in FIG. 6, according to a preferred exemplary embodiment, the dual mass flywheel output flange 126 can have penetration openings 140 through which the fastening tongues 118 extend, so that the annular body 112A with the teeth 112 and the ends of the fastening tongues 118 attached to the dual mass flywheel output flange 126 are situated on the opposite lateral face of the dual mass flywheel output flange 126 (viewed in the axial direction, and as compared with the embodiment shown in FIG. 3). Penetration openings 140 enable an enlargement of the spring travel of the fastening tongues 118, and thereby, in particular, an increase in the biasing force. FIG. 6 also shows the riveted connections 141, by means of which the fastening tongues 118 are connected with the dual mass flywheel output flange 126.

Figure 7:
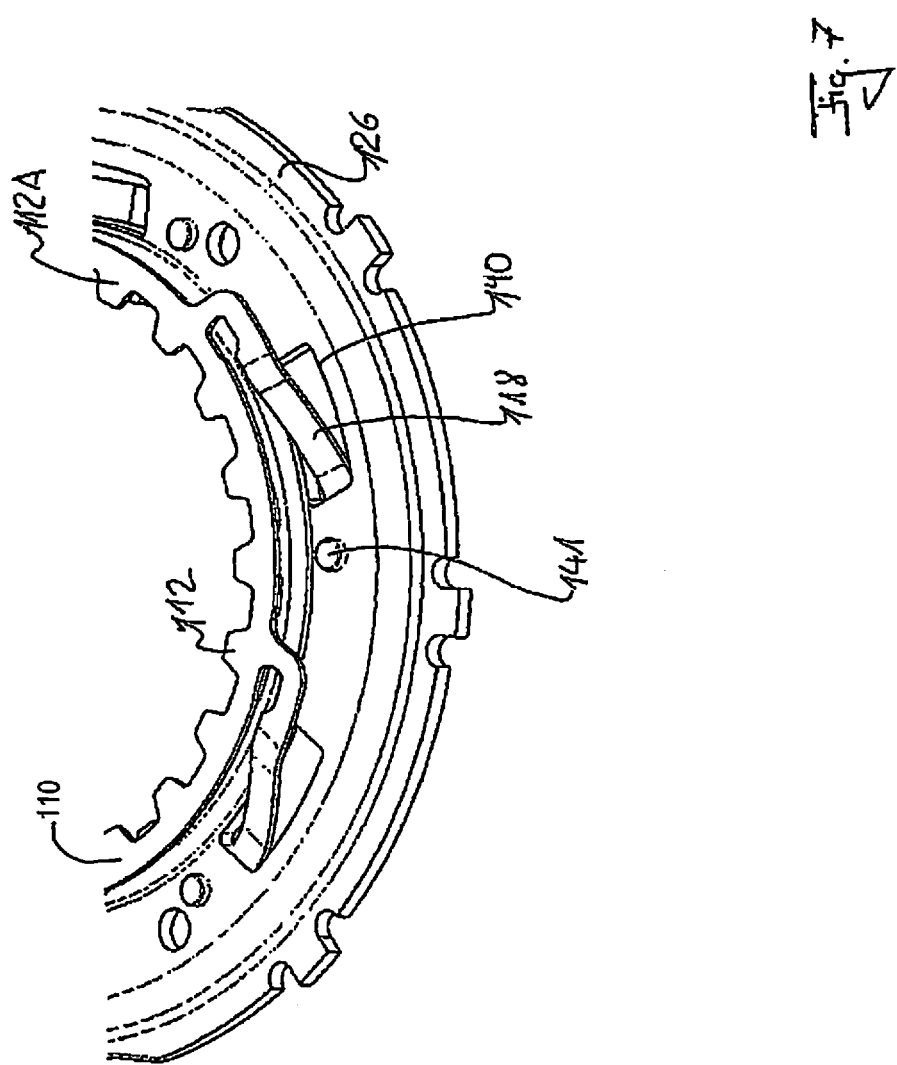
FIG. 7 shows an enlarged fragmentary view of the exemplary embodiment according to FIG. 6.

FIG. 7 shows an enlarged depiction of a portion of the clamping device shown in FIG. 6. It can be seen specifically from the perspective depiction of FIG. 7 that the annular body 112A, viewed in the axial direction of the torque transfer device, is spaced axially from the opposing lateral face of the dual mass flywheel output flange 126. If annular body 112A of the toothed ring 110 is displaced in the axial direction, for example by producing the axial spline connection between the dual mass flywheel output flange and the driver ring, the toothed ring 110 is rotated in the circumferential direction, so that an angle of the internal teeth 112 of the toothed ring 110 is changed relative to the teeth of the dual mass flywheel output flange 126, and also relative to the teeth of the driver ring of the (dual) clutch.

Figure 8:
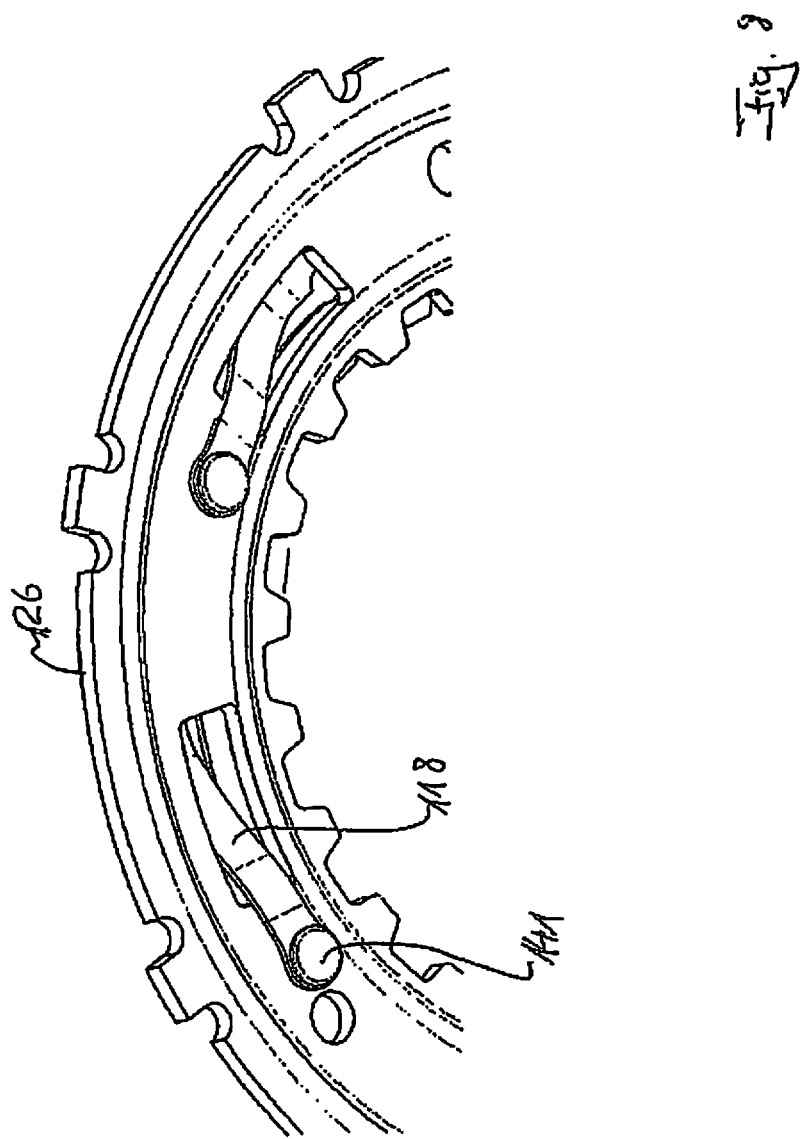
FIG. 8 shows the depiction according to FIG. 6 in an enlarged fragmentary view from the perspective of a "front side" of the dual mass flywheel flange.

FIG. 8 shows the detail shown in FIG. 7, but viewed from the opposite side (in the present case the engine side) of the dual mass flywheel output flange 126. The fastening tongues 118 are again depicted with their riveted-on outer end 123, while from this perspective the teeth of the dual mass flywheel output flange 126 are visible, but not the teeth of the toothed ring 110.

Figure 9:
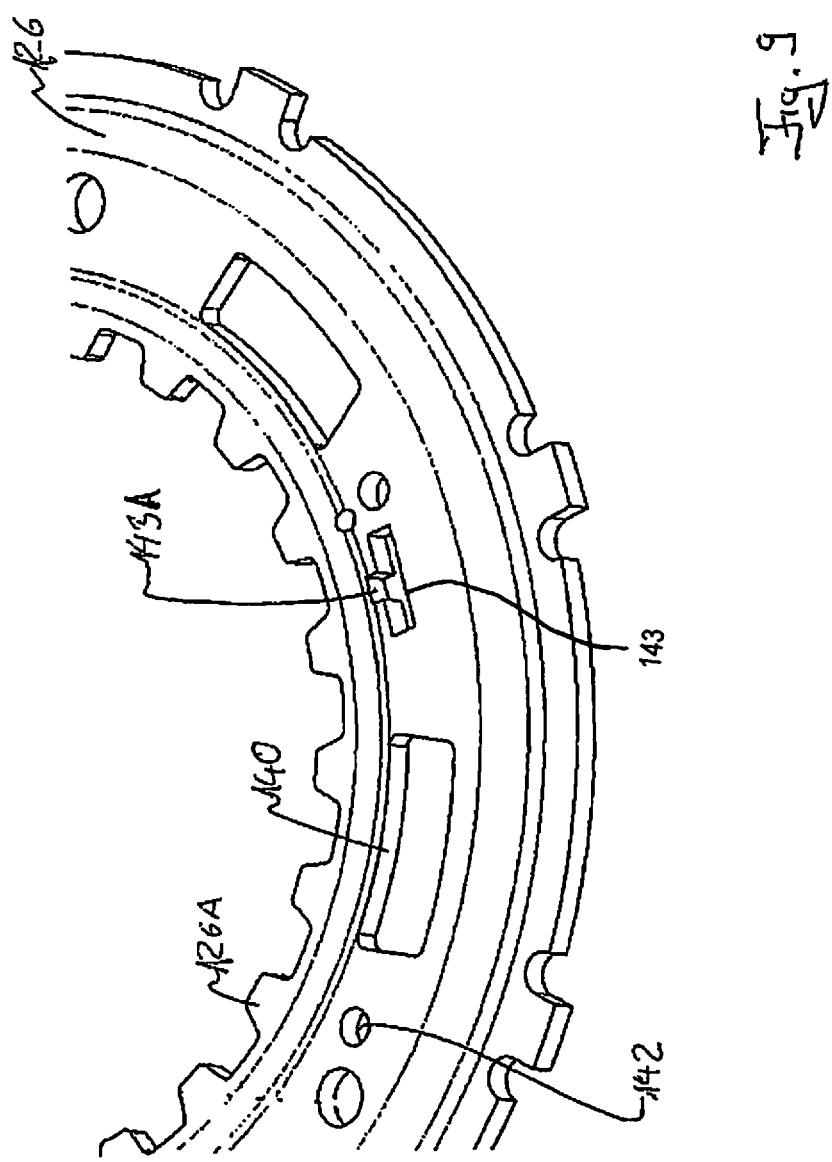
FIG. 9 shows the depiction according to FIG. 6, from the perspective of the "back side" of the dual mass flywheel output flange in a fragmentary view.

In the perspective view of FIG. 9, to clarify the situation, a portion of the dual mass flywheel output flange 126 is depicted alone, i.e., without the riveted-on toothed ring 110, so that penetration openings 140 and the teeth 126A of the dual mass flywheel output flange 126 are more clearly visible.

Also visible from FIG. 9, in addition to the penetration openings 140, are additional openings 142 in output flange 126, which are provided to enable the riveted connection 141 to attach the fastening tongues.

Figure 11:
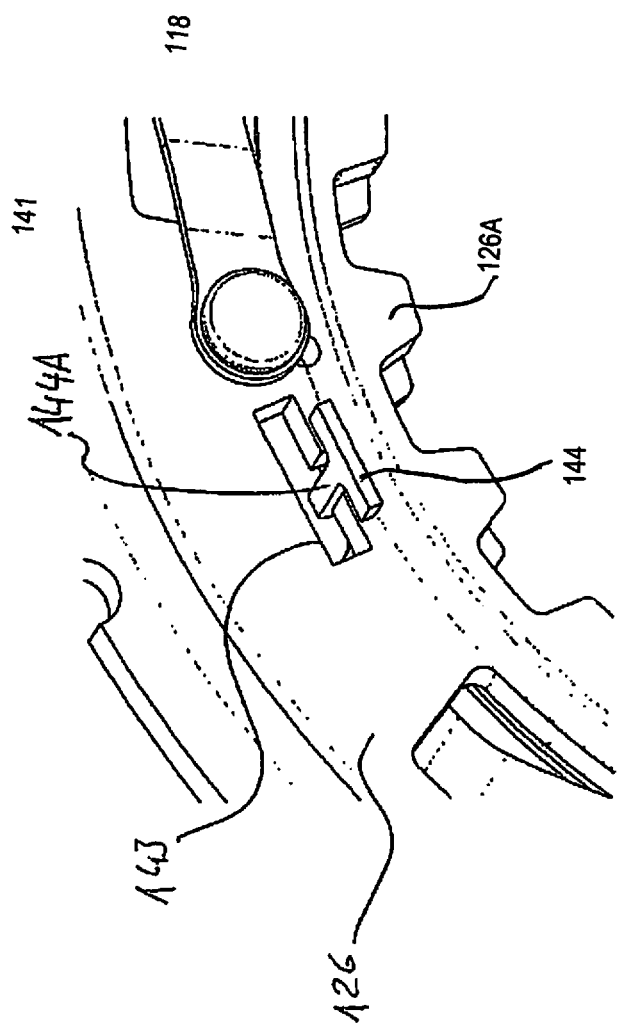
FIG. 11 shows a three-dimensional fragmentary view of a portion of the toothed ring, depicting the fastening tongues and the holding device, and a depiction of the riveted connection between the fastening tongue and the dual mass flywheel output flange.
Figure 12:
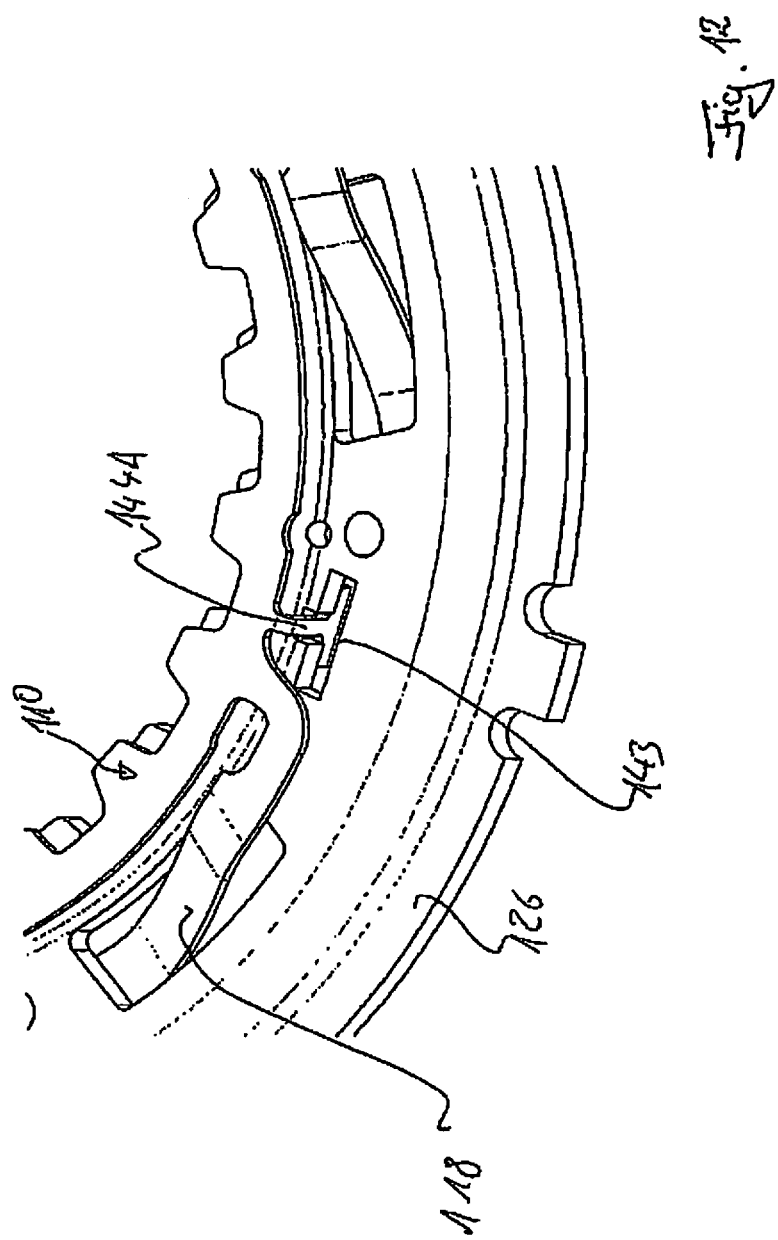
FIG. 12 shows an enlarged fragmentary view of the clamping system with "engaged" holding device.
Figure 13:
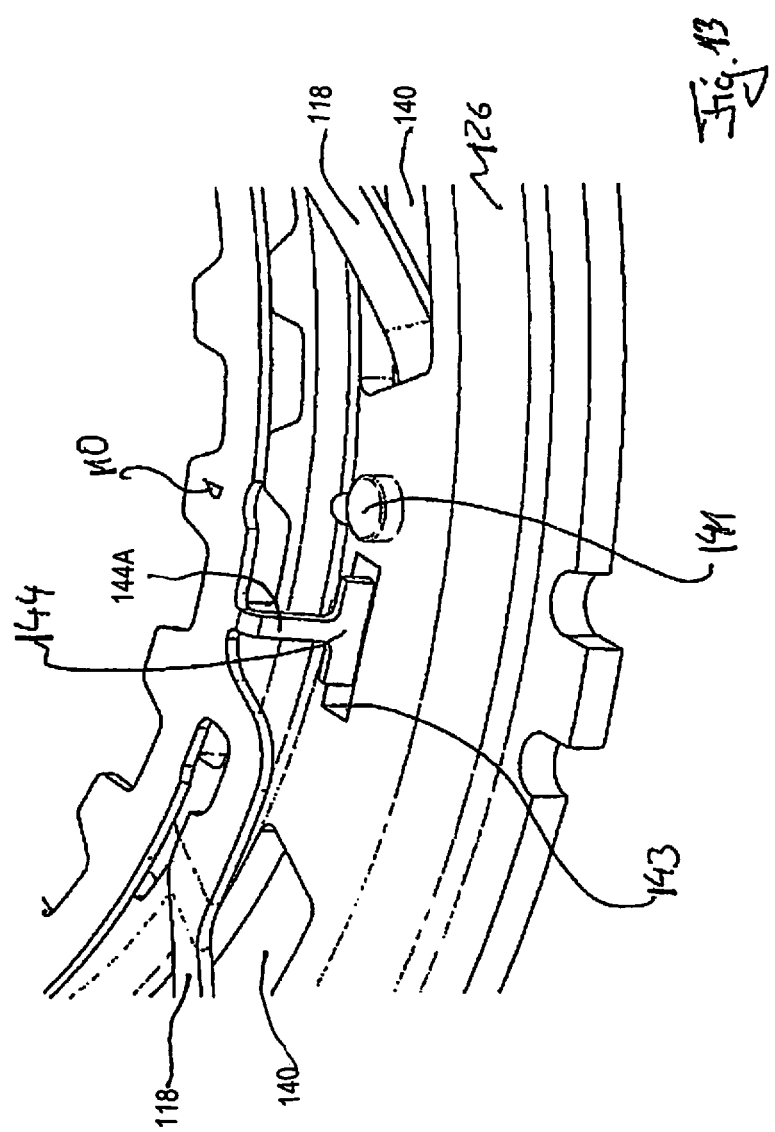
FIG. 13 shows a different fragmentary, enlarged perspective view of the clamping device in a pre-biased state (i.e., with the holding device engaged)

Another preferred exemplary embodiment, which enables force-free assembly of the axial spline connection, will be described below in conjunction with FIGS. 9-13. Here T-shaped openings 143 in output flange 126 are visible in FIG. 9, which openings are part of a holding arrangement for securing a rotated position of the toothed ring in a preassembled state. T-shaped openings 143 shown in FIG. 9 are designed with a an essentially rectangular cross section, with an additional, radially-inwardly-extending depression 143A being provided along one of the longer sides of the rectangle. T-shaped openings 143 shown in FIG. 9 correspond in cross section to outer ends of holding tabs 144 shown in FIG. 10, which are holding tabs provided on the annular body 112A of the toothed ring 110, preferably adjacent to the fastening tongues 118. The shape of holding tabs 144, "viewed from the front," is likewise rectangular, and the tabs are formed so that they are able to engage with the T-shaped openings 143 in the dual mass flywheel output flange 126. To that end, holding tabs 144 have a widened head area of rectangular form and a comparatively narrow neck 144A able to engage with the above-described depression 143A in the long side of the rectangular T-shaped opening 143, as shown in FIGS. 11-13. By means of holding tab 144, the toothed ring 110 is able to be fixed in an assembly position that is biased relative to the dual mass flywheel output flange 126, and/or relative to the driver ring. Hence, it is therefore not necessary that the rotation of the toothed ring 110 not be performed until during assembly. Rather, the toothed ring can also be rotated prior to assembly and fixed in the rotated position, so that force-free assembly is possible.

Figure 10:
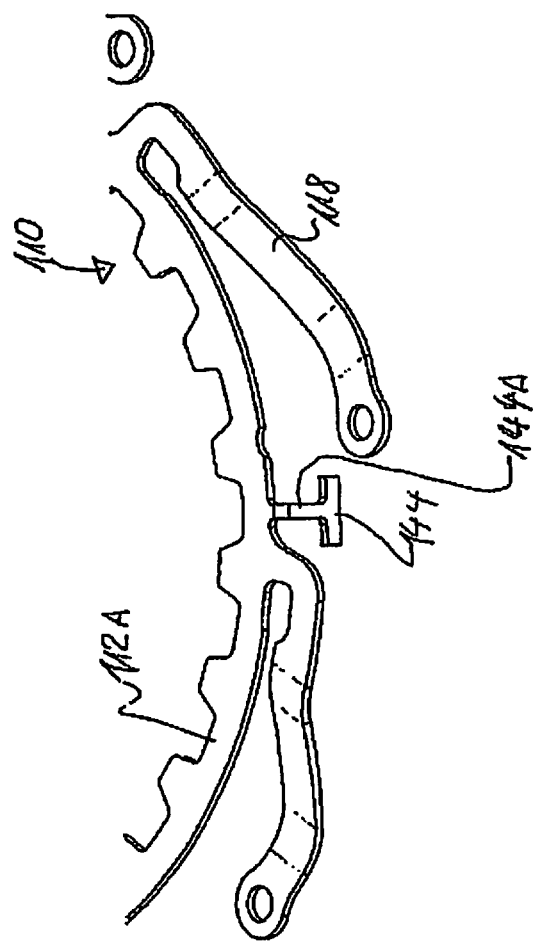
FIG. 10 shows a fragmentary three-dimensional view of the dual mass flywheel output flange with openings as a penetration possibility for the fastening tongues, as well as openings to form the positive connection between the toothed ring and the dual mass flywheel output flange.

FIG. 10 shows a fragmentary perspective view of the toothed ring 110 as an exemplary embodiment having holding tabs 144. It can be seen, that according to that exemplary embodiment fastening tongues 118, holding tabs 144, and teeth 112 of the annular body 112A are formed from spring steel sheet, resulting in an extremely inexpensive clamping device.

FIG. 11 shows—seen from one side of the dual mass flywheel output flange 126—how the holding tabs 144 of the toothed ring 110 engage with the T-shaped openings 143 in the dual mass flywheel output flange 126, in order to fix the toothed ring in position, rotated from the starting position when the riveted connection 141 is produced between the fastening tongues 118 and the output flange. FIG. 12 shows this again, viewed from the opposite side of the dual mass flywheel output flange 126. In this rotated (assembly) position, the tooth gaps and tooth widths can be chosen such that the shaft-hub connection can be assembled force-free. After the shaft-hub connection has been produced, the holding device can be released, so that the toothed ring 10 is "turned back" due to the force effect of the fastening tongues, which produces the biasing of the shaft-hub connection that is depicted in FIG. 13. At the same time, it is clearly visible that due to the rotation of the toothed ring 110 starting from the biased state, an axial position of the toothed ring 110, and hence also a depth of immersion into T-shaped opening 143 of the holding tab 144, is changed. In that position the narrowed neck 144A can no longer engage with the inwardly-extending depression 143A in the Tshaped opening 143, so that a new engagement cannot occur during operation.

If the connection is to be separated for maintenance, disassembly, or repair, the axial position of the toothed ring 110 can be changed again so that a re-engagement is possible.

The above description discloses in particular that the dual mass flywheel output flange 126 has a plurality of penetration openings 140 distributed circumferentially, through which fastening tongues 118 of the toothed ring 110 (also referred to as clamping springs) are able to extend, in which case the free ends of the fastening tongues can then be riveted, as it were, onto the back side of the dual mass flywheel output flange 126. The fastening tongues in that case are preferably situated in even circumferential distribution along toothed ring 110 (the clamping spring). That increases spring travel of the toothed ring.

The exemplary embodiments described above also show that a plurality of attaching options can be provided along the circumference of the dual mass flywheel output flange adjacent to the penetration openings. The clamping spring (the toothed ring) has a plurality of holding tabs distributed along its outer circumference, which are able to engage with the attaching options created in the dual mass flywheel output flange, depending on an axial and angular position of the toothed ring (the clamping spring). Through an axial motion and the leaf-spring-type linking of the clamping spring (the toothed ring), a rotation of the clamping spring (the toothed ring) thus occurs, which makes an assembly position possible in which the toothed ring is fixable by means of the holding tab and attaching options. If that fixing is released, the toothed ring rotates again and the shaft-hub connection is biased. The releasing of the holding device can be achieved, for example, by means of centrifugal force, whereupon attaining a certain predefined centrifugal force the attachment is released at the particular previously established (rotational speed) value, and the clamping spring and the dual mass flywheel output flange clamp the driver toothed ring. Alternatively, mechanical releasing is possible.

If the shaft-hub connection thus pre-clamped is to be disassembled again, then a relative axial motion of the dual mass flywheel output flange and the clamping spring can again be produced, whereupon, due to the leaf-spring-type linking, a rotation again occurs, by reason of which the clamping of the teeth is released. If it is also provided in this case that the holding tab of the clamping spring is radially biased in contact with the cutout in the dual mass flywheel output flange, and if a certain spacing of flange and clamping spring is not achieved (i.e., a certain rotation is reached), the holding tab again engages the cutout of the attachment in the dual mass flywheel output flange, whereby the position of the clamping spring is again fixed. The clamping of the teeth is thereby released, and the disassembly can occur.

The shaft-hub connection described above can be used with every type of toothed connection, but a particular advantage of the present shaft-hub connection lies in the fact that force-free assembly and force-free disassembly are possible. Furthermore, torque-controlled disengagement of the holding device of the toothed connection is possible. The shaft-hub connection can find use also in particular in dual clutches, specifically in the area of the axial toothed connection with a dual mass flywheel.

Thus, it is described above that the direction of rotation to enlarge the tooth gap between the toothed ring and the dual mass flywheel output flange teeth/driver toothed ring is used for disassembly (and not for assembly, as would likewise be possible). Assembly, in contrast, is ensured by the fact that the toothed ring is biased in the direction of the dual mass flywheel output flange and thus brought into an assembly position, and this is temporarily fixed. An element of the toothed ring or of the output flange can be formed as the fixing device, which engages with the appropriate corresponding component or forms a positive connection with it. The tooth gap between the components in that assembly position can be chosen large enough so that the toothed ring can be inserted into the gap without force. The pertinent locking element on the toothed ring can be released by centrifugal force or mechanically, so that the toothed ring and output flange clamp the toothed ring. With the present clamping device, the direction of rotation for enlargement of the tooth gap can now be used for disassembly. Furthermore, assembly of the shaft-hub connection is ensured by the fact that the toothed ring is biased in the direction of the component to which it is not attached, and thus is temporarily fixed in an assembly position.

Alternatively, a force-free disassembly can also be realized. In that case, the direction of rotation for enlargement of the tooth gap is used for assembly. For disassembly, the axial spacing between the toothed ring and the output flange is then made smaller; that causes the toothed ring to begin to turn, and the clamping is released. If a specified axial spacing of the two components is not reached, the fixing is activated and the toothed ring is held in its present position. The parts can accordingly be disassembled without force.

According to a preferred exemplary embodiment, the holding device includes on the one hand a locking element and on the other hand a cutout or opening or projection, where the locking element reaches into the cutout or opening or through the latter or reaches behind the projection, and thus forms a positive connection in an assembly position of the clamping device. The locking element can be formed from the toothed ring or attached to it, while the cutout or opening or projection can be formed on the element to which the toothed ring is also attached. The fixing can thus be formed directly from the toothed ring and the output flange, which reduces the number of parts in an advantageous way.

According to another exemplary embodiment, in the assembly position a tooth gap between the teeth of the toothed ring to the teeth of the hub element, and/or to the teeth of the shaft element, is so large that the toothed ring can be inserted into the gap without force, whereupon the locking element can then be released. In that case, the locking element can be releasable either by centrifugal force or mechanically, whereupon the toothed ring then exerts a biasing force between the shaft element and the hub element.

In order to ensure enlarged spring travel with a smaller axial construction space of the clamping device, according to a cumulatively or even independently realizable exemplary embodiment, the clamping device for a shaft-hub connection in a torque-transferring device in a drivetrain of a vehicle can include a shaft element having teeth and a hub element having teeth. A toothed ring having teeth is provided to clamp the shaft element with the hub element, wherein in a clamped state the teeth of the toothed ring is situated offset by an angle from the teeth of the hub element and/or from the teeth of the shaft element, wherein the toothed ring includes an annular body and fastening tongues arranged on the annular body, by means of which the toothed ring is fastened to the hub element or to the shaft element, and where the element to which the toothed ring is fastened has openings through which the fastening tongues extend. In particular, the flange can thus have penetrations which ensure enlarged spring travel while the axial construction space is smaller or remains the same.

Preferably, at least the fastening tongues, but preferably also the toothed ring as a whole, are made of an elastic material such as spring sheet metal.

It is also preferred to connect the fastening tongues to the hub element or to the shaft element by means of a riveted connection.

In addition, the present invention includes a torque-transferring system including a torsional vibration damping device (such as a dual mass flywheel) and a clutch, such as a dual clutch, the torsional vibration damping device and the dual clutch being connected with each other by means of a clamping system described above.

Figure 14:
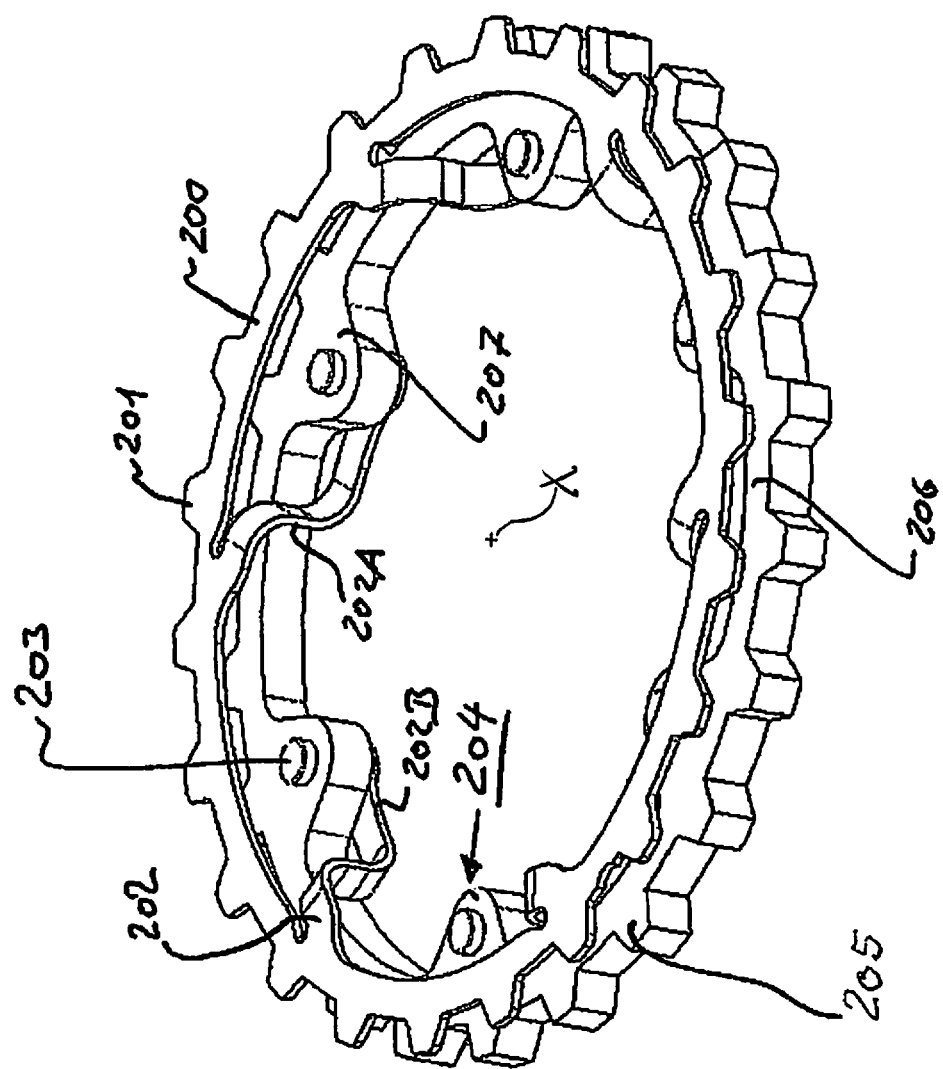
FIG. 14 shows a perspective view of a different exemplary embodiment of the clamping device with a toothed ring having external teeth (which engage the internal teeth of the dual mass flywheel output flange) and leaf-spring-type fastening tongues (which are attached to a shaft that has external teeth), where the internally toothed dual mass flywheel output flange and the externally toothed shaft form a spline connection which is clamped through the externally toothed and internally joined toothed ring due to a tangentially acting force produced by the fastening tongues, and where the dual mass flywheel output flange is not shown for the sake of clarity of the depiction.

FIG. 14 shows a perspective view of another exemplary embodiment of the clamping device, having a toothed ring with external teeth (which engage with internal teeth of the dual mass flywheel output flange) and leaf-spring-type fastening tongues (which are attached to a shaft which has external teeth). The internally-toothed dual mass flywheel output flange and the externally-toothed shaft form a spline connection that is clamped by means of the externally toothed and internally linked toothed ring due to a tangentially acting force produced by the fastening tongues. The dual mass flywheel output flange is not shown for the sake of clarity of the depiction. In addition, FIG. 15 shows a top view of the exemplary embodiment according to FIG. 14, wherein the dual mass flywheel output flange is represented as a ring-shaped element.

Figure 15:
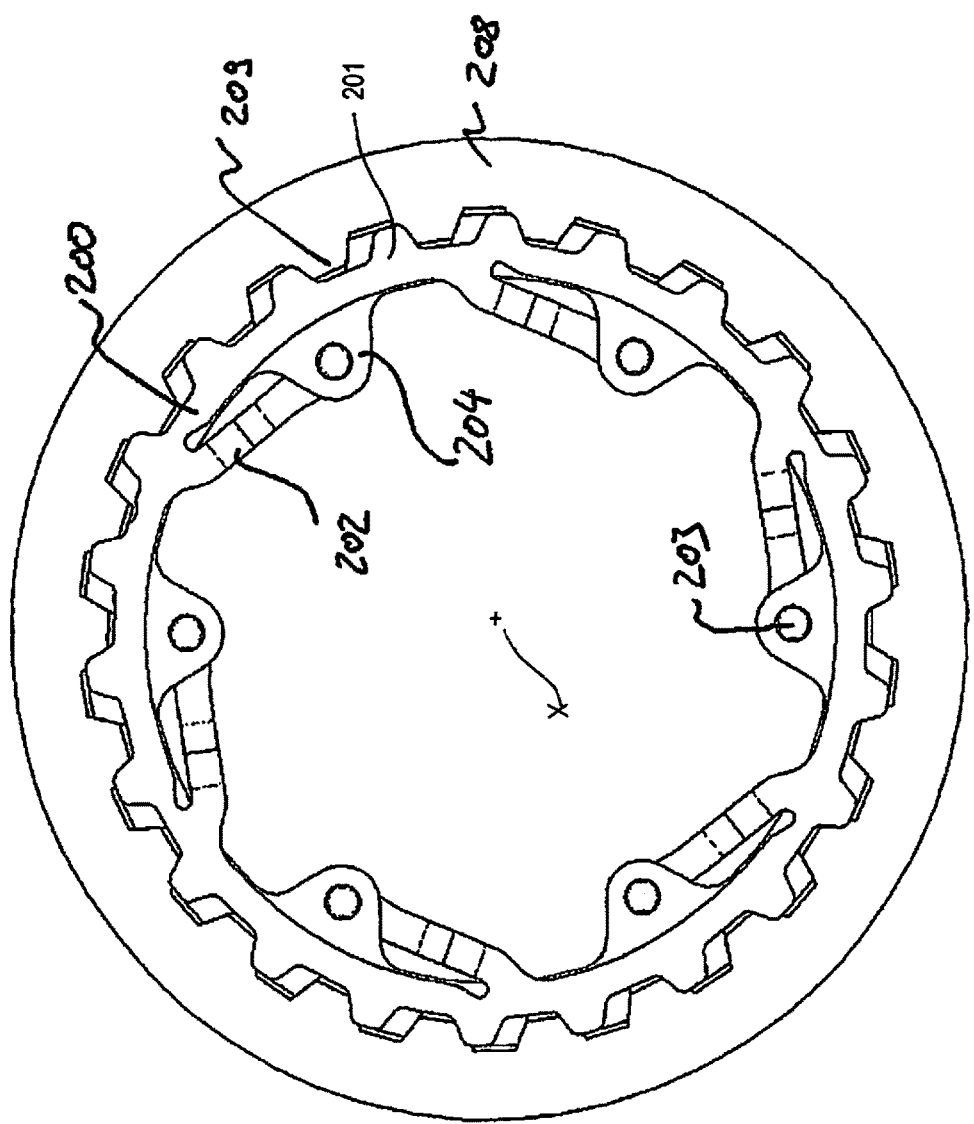
FIG. 15 shows a top view of the exemplary embodiment according to FIG. 14, wherein the dual mass flywheel output flange is symbolized by a ring-shaped element.

The toothed ring shown in FIG. 14 and FIG. 15 includes a ring-shaped annular body 200, on whose radial outer surface teeth 201 are formed, on whose radial inner surface leaf-spring-type fastening tongues 202 are situated. The toothed ring 200, 201, 202 in the present case is made in a single piece of a comparatively thin spring sheet steel. The leaf-spring-type fastening tongues 202 are connected to a shaft 204 by means of riveted connections 203. The shaft 204 includes external teeth 205. FIG. 14 depicts the shaft as a toothed rim driver having external teeth 205, an annular body 206, and connecting regions 207. Toothed rim driver 204 can be connected to a dual clutch, in particular a clutch cover of a dual clutch. As an alternative to the toothed rim driver shown, a solid shaft or a hollow shaft could also be provided as the "shaft" in the meaning of the present invention.

As shown in FIG. 14, the fastening bars 202 have a curvature along their longitudinal axis with an axial portion 202A, i.e., a portion that runs essentially parallel to the axis of the crankshaft or of the dual clutch, or of at least one of the transmission input shafts. That causes the annular body 200 of the toothed ring to lie in a first plane perpendicular to the clutch rotation axis X (see FIG. 15), viewed in the direction of the axis of rotation of the clutch, whereas a fastening zone 202B of the fastening bars 202 lies in a second plane perpendicular to the clutch rotation axis X. Viewed in the direction of the clutch rotation axis X, there is thus an axial offset between the plane of annular body 200 and the plane in which fastening zone 202B lies. In comparison to the exemplary embodiment depicted in FIGS. 6 through 13, the result is an increase in spring travel, without openings through the toothed rim driver or shaft 204 becoming necessary in the exemplary embodiment according to FIGS. 14, 15 to receive fastening tongues 202. In addition, the axial portion 202A provides the possibility of influencing the elasticity of the fastening tongues 202.

In FIG. 14 the dual mass flywheel output flange, as an example of the internally-toothed hub, has been omitted, for the sake of clarity of the drawing. The internally-toothed dual mass flywheel flange is depicted in FIG. 15 by means of an additional annular ring 208 having internal teeth 209.

In the exemplary embodiment according to FIGS. 14 and 15, the clamping of the spline connection between shaft and hub is thus realized with a toothed ring (also referred to as a clamping spring) having external teeth 201. In the present case, the toothed ring includes, besides the external teeth 201, 6 fastening tongues (also referred to as "lugs"), which have the form of leaf springs. The clamping spring is connected to the shaft by means of these fastening tongues. During assembly of the shaft-hub connection, through axial movement in the shaft and hub relative to each along the axis of rotation X, an axial movement of the clamping spring results, whose fastening bars are however supported against the shaft, so that the clamping spring must rotate relative to the shaft, which results in a tangential force, and thus a clamping of shaft and hub to each other. The rotation of the toothed ring ultimately comes about in this case by the fact that the length of the leaf-spring-type linkages remains essentially constant.

If an initial offset is provided (i.e., an offset prior to assembly of the shaft-hub connection) between the external teeth of the clamping spring and the external teeth of the shaft, then the clamping spring is not moved axially until assembly of the hub, so that the clamping spring twists tangentially to the axis of rotation. The tangential force is preferably produced by an assembly phase of the hub, or externally by an assembler (by a pre-rotation of the clamping spring, as described above).

An offset in this case between the external teeth of the clamping spring and the external teeth of the shaft is configured so that the tooth width of the opposing teeth of the hub is greater than an initial gap between the external teeth of the clamping spring and the shaft. The hub is then pushed during assembly into the "too small tooth gap" of the teeth of clamping spring and shaft, and pushes the clamping spring in the direction of the shaft. The clamping spring thereupon rotates and enlarges the tooth gap in such a way that after a certain axial travel the complete tooth of the hub is fixed. The clamping spring then clamps the shaft to the hub by its tangential biasing, the force of the biasing being calculable and presettable from the offset of the external teeth of the clamping spring and the shaft, and the tooth width of the opposing teeth of the hub.

As already described above, an assembly force can be reduced, in that the clamping spring can be biased in the direction of the shaft and thus brought to a pre-assembly state, while the fixing already described above is preferably formed from the clamping spring itself and can be realized with one or more additional elements. The tooth gap in the external teeth from shaft to clamping spring is so large in this pre-assembly position that the hub can be inserted without force into that tooth gap, whereupon the fixing element on the clamping spring is released, either by centrifugal force/ additional torque or mechanically, and the clamping spring and the output flange become clamped.

Figure 16:
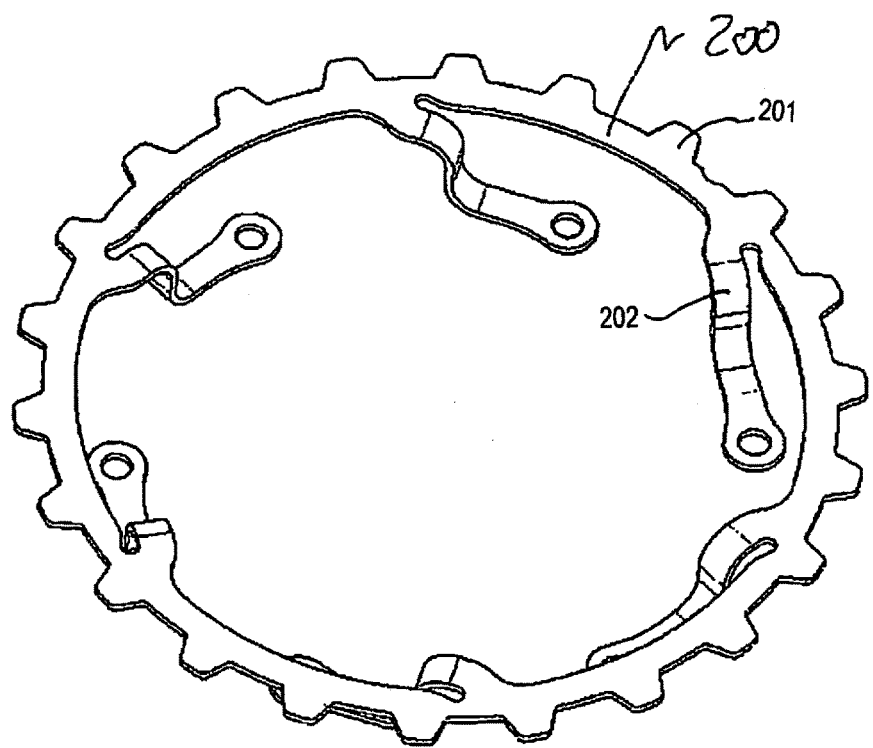
FIG. 16 shows a top perspective view of the clamping device shown in FIG. 14.

FIG. 16 shows an additional perspective view exclusively of the toothed ring/clamping spring.

What is claimed is:

1. A clamping device for an axially engageable shaft-hub connection in a torque-transferring device in a drive train of a vehicle, said clamping device comprising:
    an axial spline connection between an externally toothed shaft and an internally toothed hub for an axial plug connection of the externally toothed shaft and the internally toothed hub;
    a toothed ring for circumferentially clamping the externally toothed shaft and the internally toothed hub when they form the axial spline connection,
    wherein the toothed ring includes an annular body having teeth with intervening recesses formed on one of a radially inner circumferential edge and a radially outer circumferential edge, and includes a plurality of fastening tongues carried by the annular body and extending circumferentially relative to the annular body from one of the radially inner circumferential edge and the radially outer circumferential edge of the annular body,
    wherein the fastening tongues have a curvature in the axial direction of the toothed ring and have a second end connected to the annular body of the toothed ring and a first end spaced circumferentially from the second end and spaced axially from the annular body, the first end adapted to be connected to one of the toothed components that form the axial spline connection,
    wherein the fastening tongues have elasticity and have a curvature relative to an axial direction of the annular body of the toothed ring, so that when the first ends of the fastening tongues are attached to one of the toothed components that form the axial spline connection, the one toothed component to which the fastening tongue first ends are attached and the annular body of the toothed ring lie in different axial planes,
    wherein the fastening tongues have both circumferential and axial elasticity relative to the annular body of the toothed ring to allow both axial and circumferential relative movement between the hub and the shaft of the axial spline connection;
    wherein the teeth of the toothed ring mesh with one of teeth of the internally toothed hub and teeth of the externally toothed shaft; and
    wherein by rotating the toothed ring against a circumferential force exerted by the fastening tongues a circumferential clamping force is produced on the shaft-hub connection when the axial spline connection is in a connected state, which circumferential clamping force is introduced into the shaft-hub axial spline connection through connection of the teeth of the toothed ring with one of the externally toothed shaft and the internally toothed hub and connection of the fastening tongues with the other of the externally toothed shaft and the internally toothed hub to eliminate tooth contact noises that develop as a result of play in the shaft-hub connection of the axial spline connection.

2. The clamping device for an axially engageable shaft-hub connection according to claim 1, wherein the fastening tongues are made of elastic spring sheet metal material.

3. The clamping device for an axially engageable shaft-hub connection according to claim 1, wherein the fastening tongues are connected to one of the hub and the shaft by a riveted connection.

4. A torque-transferring system comprising:
    a torsional vibration damping device and a dual clutch that are axially engageable by an axial plug connection arrangement,
    wherein the torsional vibration damping device includes an output flange having internal teeth, and
    an input part of the dual clutch includes external teeth;
    wherein the internal teeth and the external teeth form a spline connection with each other and are connected to each other by a clamping device according to claim 1.

5. The clamping device for an axially engageable shaft-hub connection according to claim 1, wherein the toothed ring is formed from an elastic spring sheet metal material.

6. The clamping device for an axially engageable shaft-hub connection according to claim 1, wherein the fastening tongues are elongated members having leaf spring flexibility.

7. The clamping device for an axially engageable shaft-hub connection according to claim 1, wherein the teeth of the toothed ring have chamfered edges on their faces to allow relative rotation during axial connection of the shaft-hub connection to facilitate assembly of the components that are operatively joined by the axial plug in connection.

8. The clamping device for an axially engageable shaft-hub connection according to claim 1, wherein the outer ends of the fastening tongues extend through respective circumferentially spaced openings formed in the hub.

9. The clamping device for an axially engageable shaft-hub connection according to claim 8, wherein the hub is an internally toothed hub forming an output flange of a torsional vibration damper.

10. The clamping device for an axially engageable shaft-hub connection according to claim 8, wherein the circumferentially spaced openings formed in the hub are T-shaped openings, and the toothed ring includes correspondingly shaped, circumferentially spaced, T-shaped holding tabs for passage through and engagement with the T-shaped openings in the hub for positioning the toothed ring relative to the hub in a preassembled state to enable force-free assembly of the shaft-hub connection.

* * * * *